United States Patent
Hembach et al.

(10) Patent No.: US 9,537,401 B2
(45) Date of Patent: Jan. 3, 2017

(54) PUSH-PULL CONVERTER AND MODULATION METHOD FOR CONTROLLING A PUSH-PULL CONVERTER

(75) Inventors: Florian Hembach, Vienna (AT); Christoph Van Booven, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 13/983,466

(22) PCT Filed: Dec. 28, 2011

(86) PCT No.: PCT/EP2011/074151
§ 371 (c)(1), (2), (4) Date: Aug. 2, 2013

(87) PCT Pub. No.: WO2012/103994
PCT Pub. Date: Aug. 9, 2012

(65) Prior Publication Data
US 2013/0314950 A1  Nov. 28, 2013

(30) Foreign Application Priority Data
Feb. 3, 2011  (DE) .................. 10 2011 003 576

(51) Int. Cl.
*H02M 3/335* (2006.01)
*H02M 3/28* (2006.01)
(Continued)

(52) U.S. Cl.
CPC .......... *H02M 3/28* (2013.01); *H02M 3/33592* (2013.01); *H02M 3/337* (2013.01);
(Continued)

(58) Field of Classification Search
CPC  H02M 3/28; H02M 3/33507; H02M 3/33569; H02M 3/33561; H02M 3/156; H02M 3/33592;H02M 3/3376; H02M 3/337; H02M 3/3384; H02M 3/3388; H02M 3/3372; H02M 3/3378; H02M 3/157; H02M 3/1584; H02M 7/53835; H02M 7/53846; H02M 7/53862; H02M 7/53806; H02M 7/06; H02M 7/068; H02M 7/219; H02M 7/10; H02M 7/003; H02M 7/53871; H02M 7/537; H02M 7/5381; H02M 7/538; H02M 2001/0048
(Continued)

(56) References Cited

U.S. PATENT DOCUMENTS 4,953,068 A * 8/1990 Henze .............................. 363/17
5,414,609 A * 5/1995 Levran et al. .................. 363/17
(Continued)

FOREIGN PATENT DOCUMENTS

CN  1404428  3/2003
CN  1431759  7/2003
(Continued)

OTHER PUBLICATIONS

International Search Report for Application No. PCT/EP2011/074151 dated May 22, 2012 (2 pages).
(Continued)

*Primary Examiner* — Gary L Laxton
*Assistant Examiner* — Kevin H Sprenger
(74) *Attorney, Agent, or Firm* — Michael Best & Friedrich LLP

(57) ABSTRACT

A push-pull converter including a primary-side input converter circuit with a plurality of primary-side switching devices in a full-bridge circuit including a transformer being designed to receive the first AC voltage on a primary-side winding and to generate a second AC voltage on a secondary-side winding. The push-pull converter includes a secondary-side output converter circuit to convert the second AC voltage into an output DC voltage, including a first
(Continued)

semi-bridge circuit, said semi-bridge circuit including a first secondary-side switching device, a second secondary-side switching device, and a first center tap connected to a first connection of the secondary-side winding. The secondary-side output converter circuit includes a second semi-bridge circuit which includes a first secondary-side diode, a second secondary-side diode, and a second center tap connected to a second connection of the secondary-side winding, said second semi-bridge circuit not including a switchable component.

8 Claims, 6 Drawing Sheets

(51) Int. Cl.
H02M 3/337 (2006.01)
H02M 1/00 (2006.01)
(52) U.S. Cl.
CPC .. *H02M 2001/0048* (2013.01); *Y02B 70/1475* (2013.01); *Y02B 70/1491* (2013.01)
(58) Field of Classification Search
USPC ......... 363/15–17, 22–26, 125–127, 131–134
See application file for complete search history.

(56) References Cited

U.S. PATENT DOCUMENTS

| | | | |
|---|---|---|---|
| 5,742,495 A * | 4/1998 | Barone | ........................ 363/65 |
| 6,452,815 B1 | 9/2002 | Zhu et al. | |
| 6,937,483 B2 * | 8/2005 | Zhu | ................... H02M 3/33576 363/17 |
| 8,576,582 B2 * | 11/2013 | Iwaya | ............................. 363/17 |
| 2003/0002304 A1 * | 1/2003 | Zhu et al. | .................. 363/56.02 |

FOREIGN PATENT DOCUMENTS

| | | |
|---|---|---|
| CN | 101262179 | 9/2008 |
| CN | 101523710 | 9/2009 |
| CN | 201352763 | 11/2009 |
| CN | 102364860 | 2/2012 |
| DE | 202004002305 | 4/2004 |
| EP | 0784372 | 7/1997 |

OTHER PUBLICATIONS

Krismer et al., "Performance Optimization of a High Current Dual Active Bridge with a Wide Operating Voltage Range," Proceedings of the 37th Power Electronics Specialists Conference, Jeju, Korea, Jun. 18-22, 2006.

Krismer et al., "A Comparative Evaluation of Isolated Bi-directional DC/DC Converters with Wide Input and Output Voltage Range," Conference Record of the 2005 IEEE Industry Applications Conference, 40th IAS Annual Meeting (IAS'05), Hong Kong, Oct. 2-6, 2005.

Ruan et al., "A Novel Zero-Voltage and Zero-Current-Switching PWM Full-Bridge Converter Using Two Diodes in Series with the Lagging Leg," IEEE Transactions on Industrial Electronics, vol. 48, No. 4, Aug. 2001, pp. 777-785.

* cited by examiner

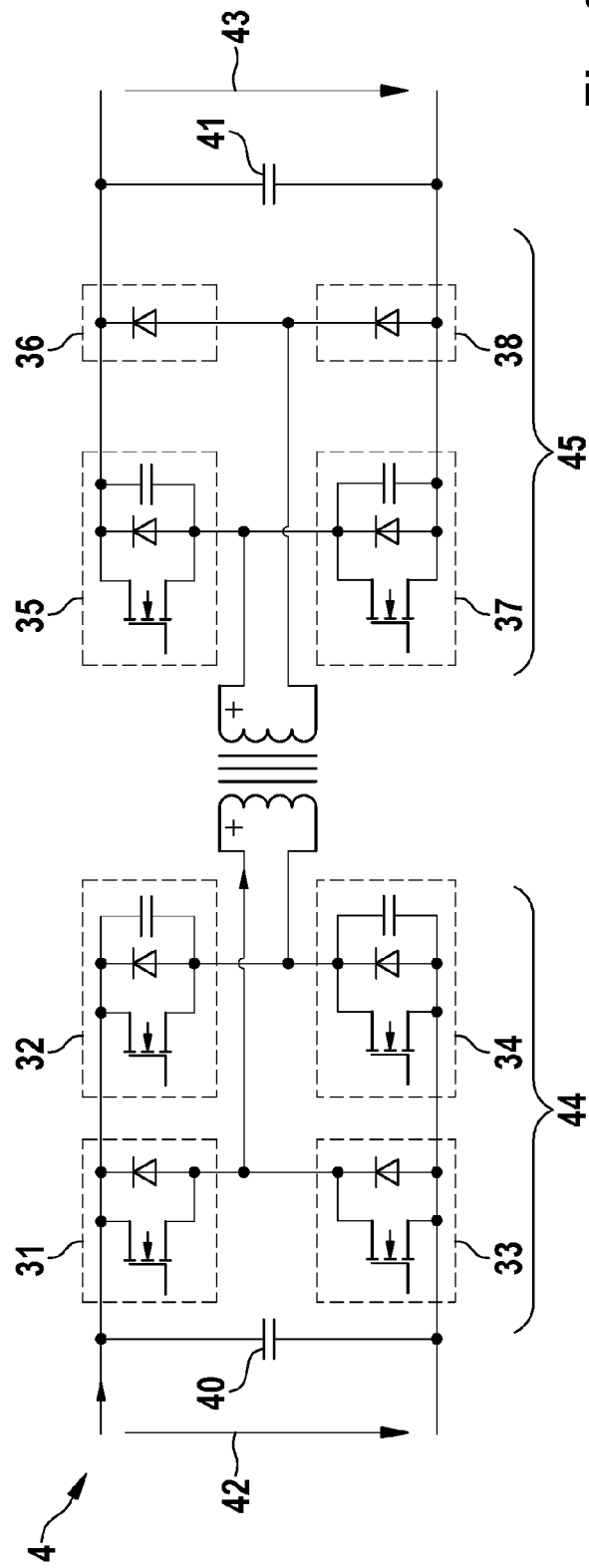

PUSH-PULL CONVERTER AND MODULATION METHOD FOR CONTROLLING A PUSH-PULL CONVERTER

BACKGROUND OF THE INVENTION

The invention relates to a push-pull converter and a modulation method for controlling a push-pull converter.

Electric vehicles frequently have a device besides the drive system for charging the battery. Such a charging device facilitates in a simple way the charging of the electric energy storage of the electric vehicle at any power outlet. To this end, the charging device produces a DC voltage for charging the fraction battery from the public low voltage network.

An option for the embodiment of a charging device 10 for a vehicle with an electric drive is shown in FIG. 1. The charging device 10 has a power factor correction 2 (PFC) which is connected to an outer conductor 1a and a neutral conductor 1b of a public low voltage network. The power factor correction 2 is designed to extract sinusoidal currents from the supply network and to transfer said currents to a DC converter 4 via an intermediate circuit comprising an intermediate circuit capacitor 3 for smoothing the pulsating power extracted from the AC power supply. The DC converter 4 is designed to provide an appropriate DC voltage for charging the battery 5 of the vehicle with an electric drive.

For reasons of safety, a galvanic isolation between the public supply network and the vehicle is required for the charging device 10. To this end, the DC converter 4 is often embodied as a push-pull converter 4 in order to create said galvanic isolation.

An option for configuring a push-pull converter is schematically depicted in FIG. 2. The push-pull converter 4' in FIG. 2 is a galvanically isolating, bidirectional DC converter comprising a so-called dual-active bridge topology. A full-bridge circuit consisting of the switching devices 131, 132, 133, 134 is thereby implemented in a primary-side input converter circuit, said switching devices transferring via a smoothing capacitor an input DC voltage to an output converter circuit by way of a transformer 139. The output converter circuit is likewise configured as a full-bridge circuit comprising the switching devices 135, 136, 137, 138 and can provide an output DC voltage 143 via a smoothing capacitor 141.

In order to control the push-pull converter 4', different modulation methods exist, among others the trapezoidal modulation method, with which a battery charging capacity can be adjusted across a broad power range from approximately 400 W to 3300 W. In the trapezoidal modulation method, the current $I_p$ takes on a trapezoidal waveform by means of the transformer 139, wherein a power transmission to the output converter circuit can take place in the plateau phases of the trapezoidal waveform as well as in a subsequent phase of a decreasing signal flank. The power to be transferred can thereby be adjusted via the height of the plateau.

Such push-pull converters 4' and corresponding modulation methods for controlling the push-pull converters are, for example, described in the publications Krismer, F., Round, S., Kolar, J. W., "Performance Optimization of a High Current Dual Active Bridge with a Wide Operating Voltage Range", "Proceedings of the 37th Power Electronics Specialists Conference, Jeju, Korea, Jun. 18-22, 2006" and Krismer, F., Biela, J., Kolar, J. W., "A Comparative Evaluation of Isolated Bi-directional DC/DC Converters with Wide Input and Output Voltage Range, Conference Record of the 2005 IEEE Industry Applications Conference, 40th IAS Annual Meeting (IAS'05), Hong Kong, Oct. 2-6, 2005".

Power losses resulting from switching processes, which in each case are implemented in a half of the input or output bridge, can occur in the trapezoidal modulation method. A suitable and complex control method comprising time-critical current detection is thereby necessary to minimize the switching losses.

SUMMARY OF THE INVENTION

The present invention relates to a push-pull converter comprising a primary-side input converter circuit with a plurality of primary-side switching devices in a full-bridge circuit, said input converter circuit being designed to convert an input DC voltage into a first AC voltage, and comprising a transformer with a primary-side winding and a secondary-side winding, said transformer being designed to receive the first AC voltage on the primary-side winding and to generate a second AC voltage on the secondary-side winding. The push-pull converter also comprises a secondary-side output converter circuit which is designed to convert the second AC voltage into an output DC voltage, comprising a first semi-bridge circuit, said semi bridge circuit comprising a first secondary-side switching device, a second secondary-side switching device and a first center tap that is connected to a first connection of the secondary-side winding. The secondary-side output converter also comprises a second semi-bridge circuit which comprises a first secondary-side diode, a second secondary-side diode and a second center tap, which is connected to a second connection of the secondary-side winding, said second semi-bridge circuit not comprising a switchable component.

The primary-side switching devices, the first secondary-side switching device and the second secondary-side switching device can preferably comprise MOSFETs, IGBTs, JFETs, BJTs, GTOs, ESBTs, SiC cascodes, thyristor circuits comprising turning-off thyristors or similar switches.

In an advantageous embodiment, a capacitor can be connected in parallel to the primary-side switching devices, the first secondary-side switching device and/or the second secondary-side switching device.

A diode can in each case advantageously be connected in anti-parallel manner to the primary-side switching devices, the first secondary-side switching device and/or to the secondary-side switching device.

The invention further relates to a modulation method for controlling an inventive push-pull converter, comprising the steps of applying a primary-side positive voltage to the primary-side winding of the transformer while the secondary-side winding is being simultaneously short-circuited via the second secondary-side switching device and the second secondary-side diode during a first time segment of a modulation cycle, of opening the second secondary-side switching device and closing the first secondary-side switching device in order to transmit power from the input converter circuit to the output converter circuit during a second time segment of the modulation cycle, of short-circuiting the primary-side winding during a third time segment of the modulation cycle and of applying a primary-side negative voltage to the primary-side winding of the transformer after the current flow through the primary-side winding of the transformer has reversed the direction of flow.

In an advantageous embodiment, the modulation method can further comprise the steps of applying the primary-side negative voltage to the primary-side winding of the transformer while the secondary-side winding is being simultaneously short-circuited via the first secondary-side switching device and the first secondary-side diode during a fourth time segment of the modulation cycle, of opening the first secondary-side switching device and closing the second secondary-side switching device in order to transmit power from the input converter circuit to the output converter circuit during a fifth time segment of the modulation cycle, of short-circuiting the primary-side winding during a sixth time segment of the modulation cycle and of applying a primary-side positive voltage to the primary-side winding of the transformer after the current flow through the primary-side winding of the transformer has reversed the direction of flow.

In an embodiment of the inventive modulation method, the step of applying the primary-side negative voltage can be delayed by a predetermined period of time after the current flow through the primary-side winding of the transformer, which has been adjusted by the magnetizing current, has reversed the direction of flow.

It is a concept of the invention to reduce the number of switchable components in a push-pull converter. This can be achieved through the use of a suitable modulation method.

By reducing the number of switchable components, the control of the push-pull converter can be simplified at the same time because the complexity of the measurement technology for detecting exact changeover time points is reduced. In addition, the inventive modulation method is robust with respect to fluctuations of the adjusted operating point, for example as a result of a change in the attached output load. Moreover, when fluctuations in the attached output load occur, critical states with increased demands on the switching components are eliminated with the inventive topology of the push-pull converter. Hence, no further safety measures have to be taken.

A very big advantage of the inventive push-pull converter is that said converter can be used very efficiently in the partial load range with the inventive modulation method. This is due to the fact that the soft-switching operation of the switching devices can also be maintained at the lowest powers by lengthening the currentless period of time; and therefore an operation in the low output power range can be performed efficiently.

BRIEF DESCRIPTION OF THE DRAWINGS

Further features and advantages of embodiments of the invention ensue from the following description with reference to the accompanying drawings.

In the drawings:

FIG. 3d shows a schematic depiction of an exemplary design of a push-pull converter according to a further embodiment of the invention;

DETAILED DESCRIPTION

Figure 1:
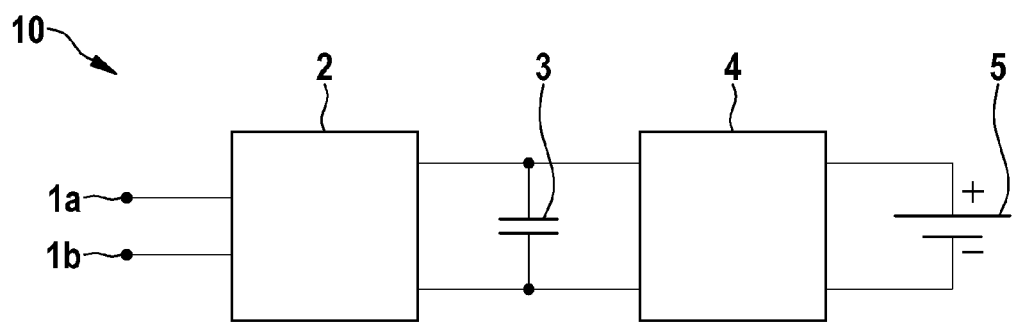
FIG. 1 shows a schematic depiction of a charging device for a battery.
Figure 2:
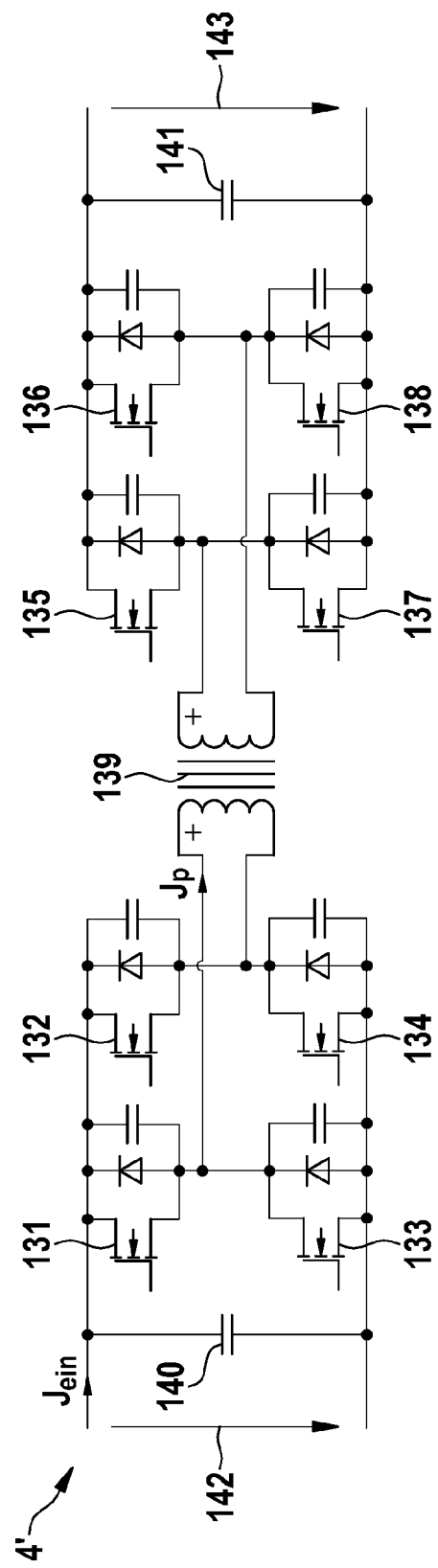
FIG. 2 shows a schematic depiction of a conventional bidirectional DC converter.
Figure 3:
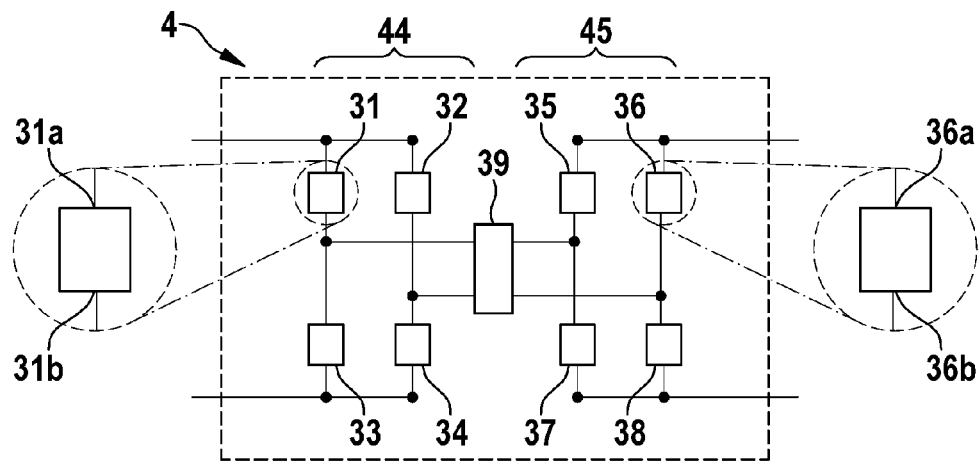
FIG. 3 shows a schematic depiction of a push-pull converter according to an embodiment of the invention.

FIG. 3 shows a schematic depiction of a push-pull converter 4 according to one embodiment of the invention. The push-pull converter 4 comprises a primary-side input converter circuit 44 with the first switching devices 31, 32, 33, and 34. The input converter circuit 44 is designed to convert an input DC voltage, which drops across said input converter circuit 44, into a primary-side AC voltage in a primary-side winding of a transformer 39. Said input converter circuit 44 is configured in a full-bridge circuit as in the push-pull converter from FIG. 2; and therefore the switching devices 31 and 33 form a first primary-side semi-bridge comprising a center tap, which is connected to a first connection of the primary-side winding of the transformer 39, and the switching devices 32 and 34 form a second primary-side semi-bridge comprising a center tap, which is connected to a second connection of the primary-side winding of the transformer 39. Provision can be made to dispose an external leakage inductor between one of the primary-side semi-bridges and the respective connection of the primary-side winding of the transformer 39.

On the secondary side, the push-pull converter 4 further comprises an output converter circuit 45 comprising first secondary-side switching devices 35 and 37, which are connected together in a first secondary-side semi-bridge circuit comprising a center tap, which is connected to a first connection of the secondary-side winding of the transformer 39. The output converter circuit 45 further comprises switching components 36 and 38 which are connected together in a second secondary-side semi-bridge circuit comprising a center tap, which is connected to a second connection of the secondary-side winding of the transformer 39.

In FIG. 3, details of the circuit components 31 and 36 are shown by way of example in the circles with dashed outlines. The circuit device 31 comprises, for example, a first connection 31a and a second connection 31b. The circuit component 36 comprises a first connection 36a and a second connection 36b. The same applies to the remaining circuit components 32, 33, 34, 35, 37, 38, wherein in each case the connection pointing upwards in the schematic depiction is denoted with the reference suffix "a" and the connection pointing downwards in the schematic depiction with the reference suffix "b". The circuit components 31 to 38 can take on different embodiments, in particular embodiments as shown in the exemplary depictions of FIGS. 3a to 3c.

Figure 3A:
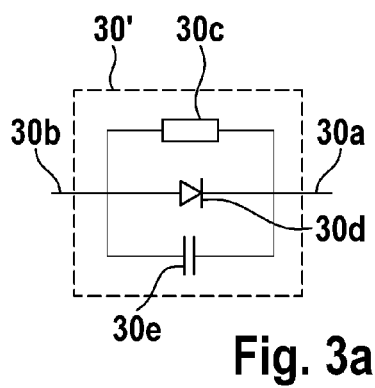
FIG. 3a shows a schematic depiction of a switching device of a push-pull converter according to a further embodiment of the invention.

FIG. 3a shows a circuit component 30' which can respectively take the place of one of the circuit components 31 to 37. The circuit component 30' is a component comprising an activatable component 30c. The activatable component 30c can be a transistor switch, for example a field-effect transistor, a MOSFET (metal-oxide-semiconductor field-effect transistor), an IGBT (insulated-gate bipolar transistor), a JFET (junction gate field-effect transistor), a BJT (bipolar junction transistor), a GTO (gate turn-off thyristor), an ESBT (emitter switched bipolar transistor), or a silicon carbide cascode circuit, a thyristor circuit comprising a turning-off thyristor or a similar switching device. It should be clear that the type of switching device of the activatable component 30c can comprise any suitable switching device. In the event that the activatable component is, for example, a self-locking, n-channel MOSFET, the source connection of the MOSFET can be connected to the connection 30b and the drain connection of the MOSFET to the connection 30a. The circuit component 30' further comprises a free-wheeling diode 30d as well as a capacitor 30e. The free-wheeling diode 30d is thereby connected in an anti-parallel manner to the activatable component 30c and the capacitor 30e is thereby connected in parallel to the activatable component 30c. The capacitor 30e serves to receive a current flow through the circuit component 30' if the activatable component 30c is brought from a closed to an open state. In so doing, a soft switching-on and off of the circuit component 30' is facilitated. Moreover, said circuit component 30' can increase the electromagnetic compatibility with other components.

The circuit component 30' comprises a first connection 30a and a second connection 30b. The first connection 30a can in each case correspond to the connections of the circuit components 31 to 37 pointing upwards and the second connection 30b in each case to the connections of the circuit components 31 to 37 pointing downwards.

In one embodiment of a push-pull converter 4 from FIG. 3, the circuit devices 32, 34, 35 and 37 can be configured like the circuit component 30' from FIG. 3a. It is however also possible to configure the circuit devices 31 and 33 like the circuit component 30'.

Figure 3B:
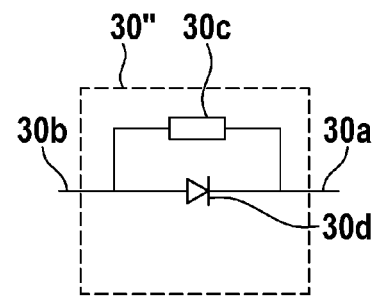
FIG. 3b shows a schematic depiction of a switching device of a push-pull converter according to a further embodiment of the invention.

FIG. 3b shows a circuit component 30", which can likewise in each case take the place of one of the circuit components 31 to 37. The circuit component 30" is only different from the circuit component 30' from FIG. 3a in that the path connected in parallel to the capacitor 30e has been removed. In so doing, circuit devices, which are configured like the circuit component 30", can no longer be so softly switched as circuit devices which are configured like the circuit component 30'. The circuit component 30" can therefore be provided in an embodiment for those circuit devices of the push-pull converter 4 from FIG. 3 with which a hard switching is not critical because, for example, the currents flowing through the circuit devices are small at the point in time of the respective switching. In one embodiment, the circuit devices 31 and 33 of the push-pull converter 4 from FIG. 3 can be configured like the circuit component 30".

Figure 3C:
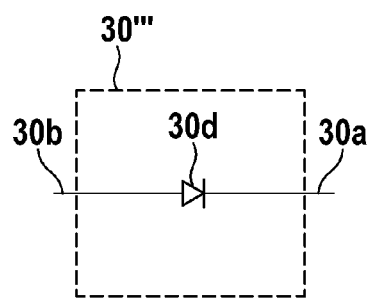
FIG. 3c shows a schematic depiction of a diode of a push-pull converter according to a further embodiment of the invention.

FIG. 3c shows a circuit component 30''' which can in each case take the place of one of the circuit components 36 or 38. The circuit component 30''' is only different from the circuit component 30" from FIG. 3 in that the activatable component 30c has been removed. The circuit component 30'''= is therefore a passive component, i.e. a component which cannot be activated.

The circuit component 30' is therefore to be provided for the circuit components 36 and 38. By means of the configuration of the circuit components 36 and 38 of the push-pull converter 4 in FIG. 3 like the circuit component 30''' from FIG. 3c, a push-pull converter 4 comprising a low number of activatable components can be created. In so doing, the complexity of the control method required for the push-pull converter 4 is reduced. Said push-pull converter 4 can in this case no longer be bidirectionally operated.

Provision can be made in one embodiment for the circuit components 36 and 38 to be configured exactly as the circuit devices 31 and 33, just like the circuit component 30". Provision can thereby be made not to include the respective activatable component 30c in the modulation method. By means of the respective permanent opening or closing of the respective activatable components 30c of either the circuit devices 31 and 33 or the circuit components 36 and 38, a power transmission direction of the push-pull converter 4 can then be preset, and said push-pull converter 4 can be bidirectionally operated.

A preferred embodiment of the push-pull converter 4 is schematically depicted in FIG. 3d. The push-pull converter 4 in FIG. 3d is configured analogously to FIG. 3 and comprises a circuit component 30" as in FIG. 3b as circuit devices 31 and 33, a circuit component 30' as in FIG. 3a as circuit devices 32, 34, 35 and 37 and a circuit component 30''' as in FIG. 3c as circuit components 36 and 38. Provision can be made for a capacitor 40 to be connected in parallel to the input converter circuit in order to smooth the input voltage 42 and for a capacitor 41 to be connected in parallel to the output converter circuit 45 in order to smooth the output voltage 43. The ratio of the input voltage 42 to the output voltage 43 can thereby be dependent on a transformation ratio of the transformer 39, which, for example, can be 1:N with N>1. The output voltage 43 can thereby be stepped up with respect to the input voltage 42. For example, an output voltage 43 can be approximately 250 V to 450 V. Provision can however also be made for the transmission ratio of the transformer 39 to be selected such that the output voltage 43 is stepped down with respect to the input voltage 42.

A modulation method for controlling a push-pull converter 4 from FIG. 3d is described below. To this end, the transformer 39 is depicted only in terms of the leakage inductance thereof, thus only in terms of the inductance which does not contribute to the ideal power transmission of the transformer 39.

Figure 4:
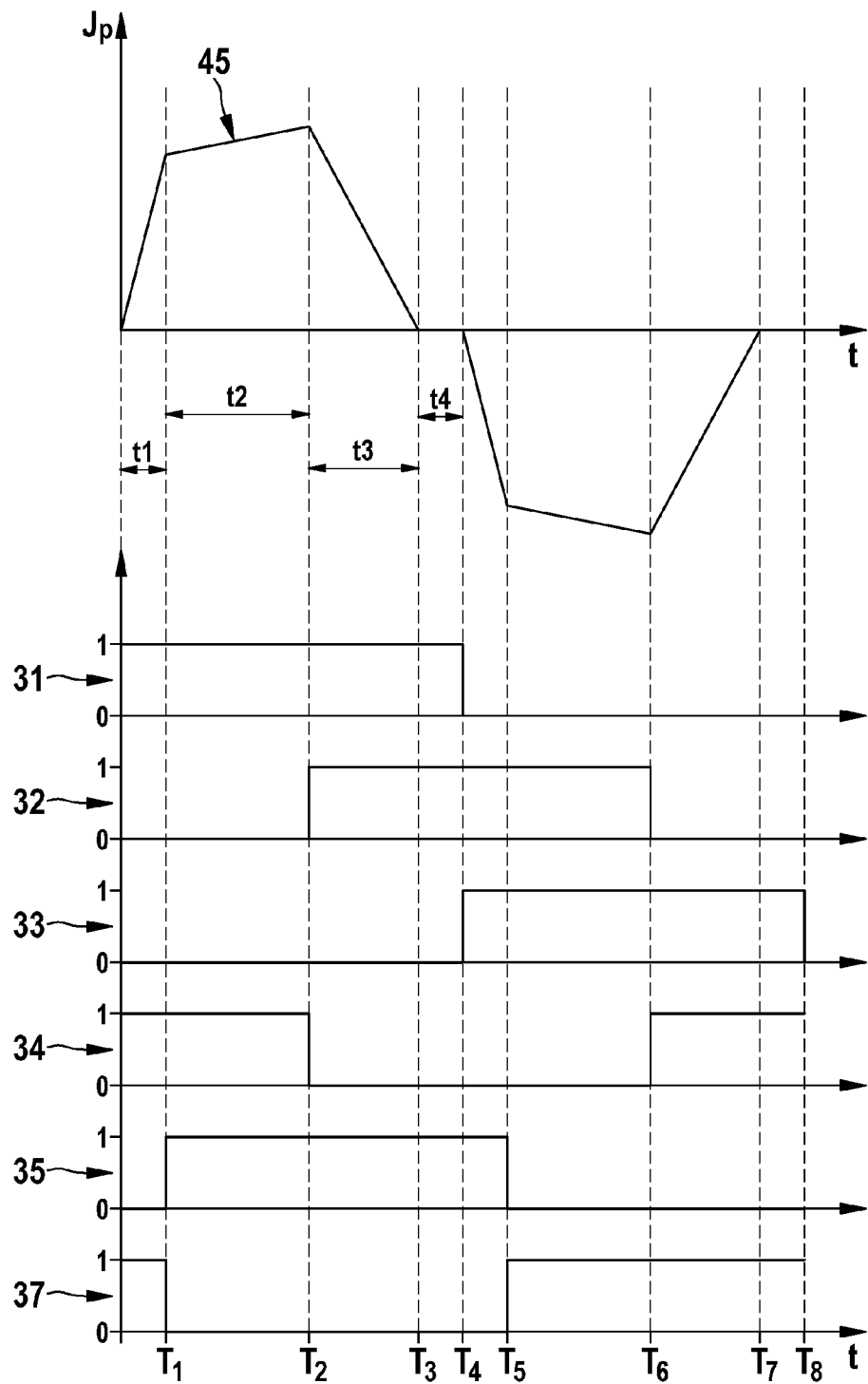
FIG. 4 shows a timing diagram of control signals of a modulation method for controlling a push-pull converter according to a further embodiment of the invention.

FIG. 4 shows a timing diagram of control signals of a modulation method for controlling a push-pull converter, for example the push-pull converter 4 from FIG. 3d. The temporal profile 45 of the current $I_p$ through the primary-side winding of the transformer 39 is shown in the topmost diagram during a run through a modulation cycle. The magnetizing current is not taken into account below in the analysis of the current $I_p$. The modulation cycle thereby comprises the period of time between the (arbitrarily selected) zero point and the point in time $T_8$. After the point in time $T_8$, the modulation cycle can be repeated according to the temporal profile depicted in FIG. 4, the point in time $T_8$ depicting in this case the zero point of the succeeding modulation cycle.

The modulation cycle comprises different modulation phases, the beginning and ending points in time of which coincide with one of the points in time $T_1$ to $T_8$. Control signals for the circuit components 31 to 35 and 37 are depicted in each case below the current diagram, which control signals in accordance with the dashed lines correlate with the associated points in time $T_1$ to $T_8$. The control signals are depicted with the value 1 for a closed state of the respectively associated activatable component and with the value 0 for an open state of the respectively associated activatable component. The activatable components are designated in each case below as switches for the sake of clarity.

In a first time segment t1 of the modulation cycle, a positive voltage is applied to the primary-side winding of the transformer 39. The switches 31 and 34 are thereby closed on the primary side. As a result of the switch 37 being closed on the secondary side, a current flow ensues through the circuit components 37 and 38. In so doing, the secondary-side winding of the transformer 39 is short-circuited. The leakage inductance of the transformer 39 is magnetized by the positive voltage in this time segment and no power transmission takes place. This facilitates a sharp increase in the current $I_p$ in the primary-side winding of the transformer 39 and thus a rapid achievement of the beginning current value for the time segment t2.

The switch 37 on the secondary side is opened at the point in time $T_1$. The switch-off process can thereby proceed in a soft-switched manner if a capacitor is connected in parallel to the switch 37. After a short dead time has elapsed for the switch-off operation, the free-wheeling diode of the switch 35, which is connected in an anti-parallel manner, becomes conductive and the switch 35 can be switched on in a soft-switched manner. In so doing, the secondary-side winding of the transformer 39 between the outputs of the output converter circuit is connected and the output voltage is applied between input and output of the leakage inductance of the transformer 39. Depending on the transformation ratio of the transformer, the current $I_p$ slightly increases in the primary-side winding of the transformer 39 or slightly decreases. In the time segment t2 between the points in time $T_1$ and $T_2$, a power transmission takes place between input converter circuit and output converter circuit 44 or, respectively, 45. The time segment t2 is to be selected as long as possible in order to ensure an efficient operation with a high power transmission.

At the point in time $T_2$, the switch 34 is switched off on the primary side, in turn in a soft-switched manner via a capacitor. The current $I_p$ commutates thereby to the free-wheeling diode of the switching device 32. After a dead time for switching off the switch 34, the switch 32 is switched on in a soft-switched manner. In a time segment t3 following the point in time $T_2$, the current $I_p$ decreases as a function of the magnitude of the output voltage.

At a point in time $T_3$, the current $I_p$ has dropped to zero and becomes minimally negative. The diode of the circuit component 38 prevents a secondary-side reversal of the current direction, whereby the diode of the circuit component 36 becomes conductive. In the time segment t4 between the points in time $T_3$ and $T_4$, no power transmission takes place. If, for example, a maximum power transmission is desired, the length of the time segment t4 is preferably set as small as possible. It is however possible to extend the time segment t4 to a predetermined period of time and to delay the beginning of the second half cycle at the point in time $T_4$. In this way, only a small amount of power can be transmitted, for example in a partial load operation of the push-pull converter. The time segment t4 can therefore in principle be extended as long as desired without the corresponding circuit components losing the soft-switch properties thereof.

The second half cycle of the modulation method begins at the point in time $T_4$. To this end, the switch 31 is initially opened and the switch 33 closed. As a result of the switches 31 and 33 in the embodiment of the push-pull converter 4 in FIG. 3d not comprising capacitors that are connected in parallel, these two switching processes occur in a hard-switched manner. The current flow in the time segment t4 is however only minimal, and therefore switching losses can thus hardly occur. On the secondary side, the current then flows through the switching device 35 and the diode of the circuit component 36. The time segment between the points in time $T_4$ and $T_5$ consequently corresponds to the time segment t1 as far as the profile is concerned with the difference that the current $I_p$ now flows in the opposite direction.

At the point in time $T_5$, a soft switching of the switches 35 and 37 occurs analogously to the point in time $T_1$, whereby again a plateau phase of the power transmission is introduced. At the point in time $T_6$ and analogously to the point in time $T_2$, the switch 32 is switched off in a soft-switched manner and the switch 34 is switched on in a soft-switched manner. Analogously to the point in time $T_3$, the current $I_p$ again reaches a zero crossing; and analogously to the time segment t4, a dead time up to the point in time $T_8$ can be maintained, in which the secondary-side current autonomously commutates to the diode of the circuit component 38. At the point in time $T_8$, a complete modulation cycle of the modulation method is thus completed.

Figure 5A:
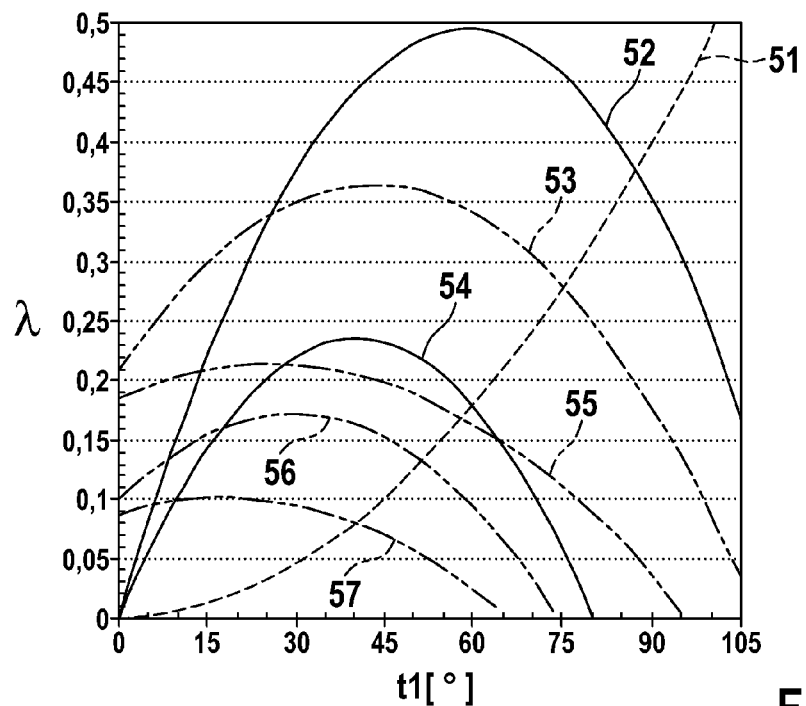
FIG. 5a shows a diagram comprising control curves for a modulation method for controlling a push-pull converter according to a further embodiment of the invention.

FIG. 5a shows the profile of the proportionately transmitted power 8 as a ratio between output power $P_{aus}$ and a standardized power $P_{norm}$ that is a function of the input voltage and the leakage inductance of the transformer 39. The input power $P_{norm}$ is therefore defined as $$P_{norm} = U_{ein} * I_{ein} = U_{ein}^2 * X_L^{-1} = U_{ein}^2 * (\omega L)^{-1},$$

wherein $U_{ein}$ represents the input voltage, $\omega$ the modulation angular frequency and L the leakage inductance of the transformer 39. The proportionately transmitted power 8 is thereby plotted versus the length of the time segment 11, the length of the time segment 11 being specified in degree units of the modulation cycle. 180E thereby correspond to the sum of the time segments t1, t2, t3 and t4 of the first half cycle of the modulation cycle from FIG. 4.

Six different power transmission profiles 52, 53, 54, 55, 56 and 57 are respectively shown as a function of the voltage ratio d of the topology according to the invention and a length of the time segment t4. The curve 52 then shows the power transmission at a voltage transformation ratio of d=1 and a length of the time segment t4 of 5E, the curve 53 the power transmission at a voltage transformation ratio of d=0.75 and a length of the time segment t4 of 5E, the curve 54 the power transmission at a voltage transformation ratio of d=1 and a length of the time segment t4 of 60E, the curve 55 the power transmission at a voltage transformation ratio of d=0.75 and a length of the time segment t4 of 60E, the curve 56 the power transmission at a voltage transformation ratio of d=0.5 and a length of the time segment t4 of 5E, and the curve 57 the power transmission at a voltage transformation ratio of d=0.5 and length of the time segment t4 of 60E.

First, it can be seen that the effective power transmission 8 decreases if the time segment t4 is extended. In principle it is therefore possible to control the effective power transmission 8 over the length of the time segment t4, i.e. over the length of the dead time between two trapezoidal half cycles of the modulation cycle. It is however also advantageously possible to set the length of the time segment t1 for a predetermined (minimum) length of the time segment t4. Due to the parabolic shape of the curves 52 to 57, two adjustable operating points therefore result for each effective power transmission 8 to be set. For example, the possible operating points for the time segment t1 are approximately 32E and approximately 85E for the curve 52 at a desired power transmission 8 of 0.4, as results from FIG. 5a. It is thereby advantageous if the operating point with the shorter time segment t1 is selected—in the example therefore approximately 32E—because in this case the conduction losses are also lower due to lower current flows.

It should be noted, however, that the time segment t3, which is required to reduce the current flow through the primary-side winding of the transformer, is also extended when the duration of the time segment t1 is extended. From a certain length of the time segment t1, the sum of the time durations t1 and t3 is therefore exactly as large as the length of the modulation half cycle less the (minimum) dead time duration t4. In this case, the length of the time segment t2, i.e the duration during a modulation cycle, is reduced to zero while the direct power transmission can take place between the windings of the transformer. The locus curve of these points is plotted as curve 51 in the diagram in FIG. 5a. In other words, those durations of the time segments t1, for which a direct power transmission can no longer take place, lie to the right of the curve 51 for each given power transmission 8. If, however, the shorter duration of the time segment t1 is in each case selected as the operating point, a direct and therefore efficient power transmission is always ensured.

Figure 5B:
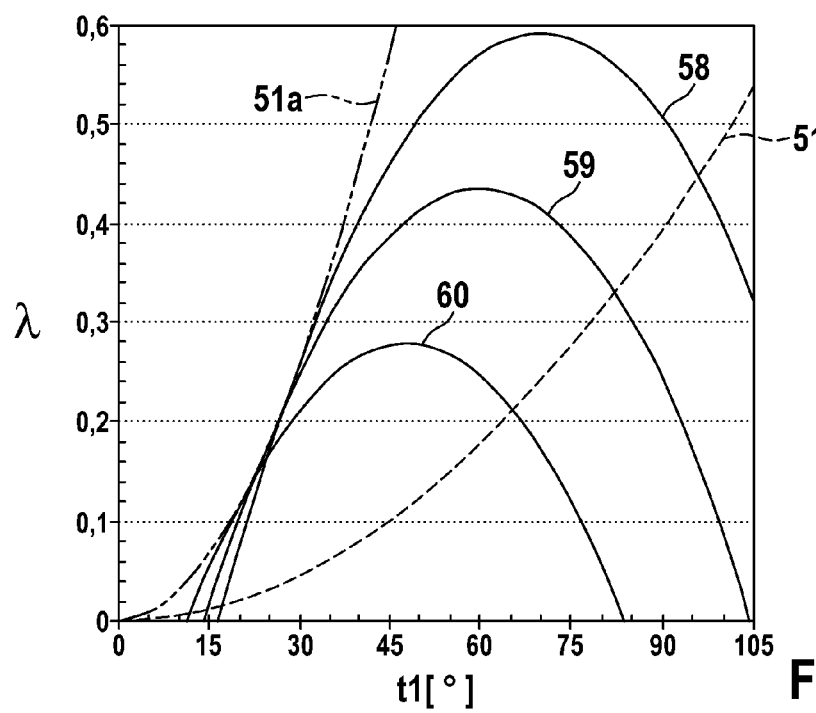
FIG. 5b shows a diagram comprising control curves for a modulation method for controlling a push-pull converter according to a further embodiment of the invention.

FIG. 5b shows the profile of the proportionately transmitted power 8 as a ratio between output power $P_{aus}$ and input power $P_{norm}$ for a voltage ratio greater than 1, i.e. for increasing the input voltage to a higher output voltage in the push-pull converter 4 from FIG. 3d. The diagram shows three different power transmission profiles 58, 59 and 60, in each case as a function of the voltage transformation d of the transformer and a length of the time segment t4. The curve 58 shows thereby the power transmission at a voltage transformation of d=1.2 and a length of the time segment t4 of 5E, the curve 59 the power transmission at a voltage transformation of d=1.2 and a length of the time segment t4 of 30E and the curve 60 the power transmission at a voltage transformation of d=1.2 and a length of the time segment t4 of 60E. The proportionately transmitted power 8 is thereby plotted in degrees versus the length of the time segment t1.

Besides the curve 51 which was already described in reference to FIG. 5a and to the right of which, for each given power transmission 8, those durations of the time segments t1 lie for which a direct power transmission can no longer take place, the curve 51a is shown in FIG. 5b. The curve 51a is tangent to each of the curves 58, 59 and 60 at a point, which corresponds in each case to a minimum duration of the time segment t1, beneath which duration the duration of the time segment t3 becomes zero because the drop in current flow during the power transmission phase of the time segment t2 is already sufficient to bring the current flow to zero. The trapezoidal modulation for too low of a selection of the duration of time segment t1 method thereby effectively becomes a triangular modulation method. This in fact does not present any danger to the circuit components of the push-pull converter, is, however, associated with less favorable current effective values than a genuine trapezoidal modulation method.

The invention claimed is:

1. A push-pull converter comprising:
a primary-side input converter circuit with a plurality of primary-side switching devices in a full-bridge circuit, said primary-side input converter circuit being designed to convert an input DC voltage into a first AC voltage;
a transformer with a primary-side winding and a secondary-side winding, said transformer being designed to receive the first AC voltage on the primary-side winding and to generate a second AC voltage on the secondary-side winding; and
a secondary-side output converter circuit which is designed to convert the second AC voltage into an output DC voltage, the secondary-side output converter circuit including
a first semi-bridge circuit, said first semi-bridge circuit including a first secondary-side switching device, a second secondary-side switching device and a first center tap that is connected to a first connection of the secondary-side winding,
said secondary-side output converter also including
a second semi-bridge circuit which includes a first secondary-side diode, a second secondary-side diode and a second center tap which is connected to a second connection of the secondary-side winding, said second semi-bridge circuit not including a switchable component and
a controller configured to
apply a primary-side positive voltage of the input DC voltage across the primary-side winding of the transformer while the secondary-side winding is being simultaneously short-circuited via the second secondary-side switching device and the second secondary-side diode during a first time segment,
open the second secondary-side switching device and close the first secondary-side switching device in order to transmit power from the input converter circuit to the output converter circuit during a second time segment of the modulation cycle,
short circuit the primary-side winding during a third time segment of the modulation cycle,
apply a primary side negative voltage of the input DC voltage to the primary-side winding of the transformer after the current flow through the primary-side winding of the transformer, which has been adjusted by the magnetizing current, has reversed the direction of flow,
apply the primary-side negative voltage of the input DC voltage across the primary-side winding of the transformer while the secondary-side winding is being simultaneously short-circuited via the first secondary-side switching device and the first secondary-side diode during a fourth time segment of the modulation cycle;
open the first secondary-side switching device and close the second secondary-side switching device in order to transmit power from the input converter circuit to the output converter circuit during a fifth time segment of the modulation cycle;
short circuit the primary-side winding during a sixth time segment of the modulation cycle; and
apply a primary-side positive voltage across the primary-side winding of the transformer after the current flow through the primary-side winding of said transformer, which has been adjusted by the magnetizing current, has reversed the direction of flow.

2. The push-pull converter according to claim 1, wherein the primary-side switching devices, the first secondary-side switching device and the second secondary-side switching device comprise MOSFETs, IGBTs, JFETs, BJTs, GTOs, ESBTs, SiC cascodes or thyristor circuits including turning-off thyristors.

3. The push-pull converter according to claim 2, wherein a capacitor is connected in each case in parallel to one or a plurality of the primary-side switching devices, to the first secondary-side switching device and/or to the second secondary-side switching device.

4. The push-pull converter according to claim 2, wherein a diode is connected in each case in an anti-parallel manner to the primary-side switching devices, to the first secondary-side switching device and/or to the second secondary-side switching device.

5. The push-pull converter according to claim 1, wherein the step of applying the primary-side negative voltage is delayed by a predetermined period of time after the current flow through the primary-side winding of the transformer, which has been adjusted by the magnetizing current, has reversed the direction of flow.

6. The push-pull converter of claim 1, wherein the primary-side input converter circuit with the plurality of primary-side switching devices in the full-bridge circuit includes
- a first primary-side switching device connected to a first terminal of the primary-side winding,
- a second primary-side switching device connected to a second terminal of the primary-side winding,
- a third primary-side switching device connected to the first terminal of the primary-side winding, and
- a fourth primary-side switching device connected to the second terminal of the primary-side winding,
- wherein the controller is configured to apply the primary-side positive voltage of the input DC voltage across the transformer by closing the first primary-side switching device, closing the fourth primary-side switching device, opening the second primary-side switching device, and opening the third primary-side switching device.

7. The push-pull converter of claim 1, wherein the primary-side input converter circuit with the plurality of primary-side switching devices in the full-bridge circuit includes
- a first primary-side switching device connected to a first terminal of the primary-side winding,
- a second primary-side switching device connected to a second terminal of the primary-side winding,
- a third primary-side switching device connected to the first terminal of the primary-side winding, and
- a fourth primary-side switching device connected to the second terminal of the primary-side winding,
- wherein the controller is configured to apply the primary-side positive voltage of the input DC voltage across the transformer by closing the first primary-side switching device and the fourth primary-side switching device, and
- wherein the controller is configured to apply the primary-side negative voltage of the input DC voltage across the transformer by closing the second primary-side switching device and the third primary-side switching device.

8. The push-pull converter of claim 7, wherein the controller is configured to apply the primary-side positive voltage of the input DC voltage across the primary-side winding of the transformer after the current flow through the primary-side winding of said transformer by closing the first primary-side switching device and the fourth primary-side switching device.

* * * * *